(12) United States Patent
Thompson et al.

(10) Patent No.: US 9,149,793 B2
(45) Date of Patent: Oct. 6, 2015

(54) CARBON COMPOSITE MATERIALS FOR SEPARATIONS

(75) Inventors: Jonathan Thompson, Center City, MN (US); Dwight Stoll, St. Peter, MN (US)

(73) Assignee: United Science, LLC, Center City, MN (US)

( * ) Notice: Subject to any disclaimer, the term of this patent is extended or adjusted under 35 U.S.C. 154(b) by 0 days.

(21) Appl. No.: 13/877,571

(22) PCT Filed: Oct. 7, 2011

(86) PCT No.: PCT/US2011/055205
§ 371 (c)(1),
(2), (4) Date: Apr. 3, 2013

(87) PCT Pub. No.: WO2012/048185
PCT Pub. Date: Apr. 12, 2012

(65) Prior Publication Data
US 2013/0203589 A1     Aug. 8, 2013

Related U.S. Application Data

(60) Provisional application No. 61/390,821, filed on Oct. 7, 2010, provisional application No. 61/452,112, filed on Mar. 12, 2011.

(30) Foreign Application Priority Data

Jan. 18, 2011    (WO) ................. PCT/US11/21537

(51) Int. Cl.
*B01J 20/00*     (2006.01)
*B01J 20/32*     (2006.01)
(Continued)

(52) U.S. Cl.
CPC .......... *B01J 20/3214* (2013.01); *B01D 15/265* (2013.01); *B01D 15/32* (2013.01); *B01J 20/103* (2013.01); *B01J 20/20* (2013.01); *B01J 20/283* (2013.01); *B01J 20/2808* (2013.01); *B01J 20/28057* (2013.01); *B01J 20/28083* (2013.01); *B01J 20/3078* (2013.01);
(Continued)

(58) Field of Classification Search
CPC .................... C04B 35/63416; C04B 35/6261; C04B 35/62695; C04B 35/321; C04B 35/62655; C04B 35/532; C04B 35/522; C04B 2235/6567; C04B 2235/6562; C04B 2235/5427; C04B 2235/604; C04B 2235/5436; C04B 2235/96; C04B 2235/9607; C04B 2235/5296; C04B 2235/547; C01B 31/04
USPC .................... 502/413, 416; 428/304.5, 304.4
See application file for complete search history.

(56) References Cited

U.S. PATENT DOCUMENTS

| | | |
|---|---|---|
| 5,346,619 A | 9/1994 | Funkenbusch et al. |
| 5,738,790 A | 4/1998 | Hagen et al. |
| 2009/0188852 A1 | 7/2009 | Chen et al. |

OTHER PUBLICATIONS

Majors, Ronald E. "Developments in HPLC column packing design." LC GC Magazine—North America—Solutions for Separation Scientists 29 (2006): 8-15.*

(Continued)

*Primary Examiner* — Richard M Rump
(74) *Attorney, Agent, or Firm* — Haugen Law Firm PLLP

(57) ABSTRACT

A composite particulate material useful in analytical separations processes includes a carbon coating deposited through chemical vapor deposition on a substantially metal-free inorganic oxide particle. The resultant laminate material may be tuned for desired sorption rates and selectivities with respect to analytes of interest.

6 Claims, 14 Drawing Sheets

(51) Int. Cl.
- B01J 20/283 (2006.01)
- B01J 20/20 (2006.01)
- B01J 20/30 (2006.01)
- B01J 20/28 (2006.01)
- B01J 20/10 (2006.01)
- B01D 15/26 (2006.01)
- B01D 15/32 (2006.01)

(52) U.S. Cl.
CPC ........... B01J 20/324 (2013.01); B01J 20/3204 (2013.01); B01J 20/3225 (2013.01); B01J 20/3246 (2013.01); B01J 20/3285 (2013.01)

(56) References Cited

OTHER PUBLICATIONS

Su, Fabing, et al. "Preparation and characterization of highly ordered graphitic mesoporous carbon as a Pt catalyst support for direct methanol fuel cells." Chemistry of materials 17.15 (2005): 3960-3967.*

Bebris et al., "Liquid chromatography on Carbosilochrom and carbosilica gel-silica adsorbents with a modified carbon surface" Chromatographia, vol. 11, No. 4 Apr. 1978, pp. 206-211.

W. V. Kotlensky, "Pyrolitic Carbon in Porous Solids", The Chemistry and Physics of Carbon, 173-263 (P. Walker et al., eds. 1973).

C. Paek et al., "Preparation and evaluation of carbon coated alumina as a high surface area packing material for high performance liquid chromatography", Journal of Chromatography A vol. 1217, Issue 42, Oct. 15, 2010, pp. 6475-6483.

Leboda et al., "The Chemical Nature of Adsorption Centers in Modified Carbon-Silica Adsorbents Prepared by the Pyrolysis of Alcohols", Chromatographia, 13, 703 (1980).

Leboda et al., "Preparation of Complex Carbon-Silica Adsorbents with Different Properties", Chromatographia, 13, 549 (1980).

Leboda et al., "Preparation and Modification of Complex Pyrolytic Carbon-Silica Adsorbents", Chromatographia, 14, 524 (1981).

Leboda et al., "Properties of Carbon-Silica Adsorbents Prepared by Pyrolysis of Aliphatic and Aromatic Alcohols", Chromatographia, 12, No. 4, 207-211 (1979).

O. Chiantore et al., "Characterization of Porous Carbons for Liquid Chromatography", Analytical Chemistry, 60, 638-642 (1988).

N. K. Bebris et al., "Liquid Chromatography on Carbosilochrom and Carbosilica Gel—Silica Adsorbents with a Modified Carbon Surface" Chromatographia, 11, 206-211 (1978).

P. Carrott et al., "The adsorption of nitrogen and water vapour by carbon-coated precipitated silica", Colloids and Surfaces, 21, 9-15 (1986).

H. Colin et al., "Comparison of Some Packings for Reversed-Phase Highperformance Liquid-Solid Chromatography I. Some Analytical Considerations", J. Chromatography, 149, 169-197 (1978).

S. Butterworth et al., "Carbon-Coated Alumina As a Catalyst Support", Applied Catalysis, 16, 375-388 (1985).

P. Haas, "Plasma Energy: The Ultimate in Heat Transfer", Chemical Engineering Progress, 44-52 (Apr. 1989).

* cited by examiner

| Carbon Source Temperature (oC) | Furnace Temp (oC) | % Carbon |
|---|---|---|
| 0 | 700 | 1 |
| 25 | 700 | 10 |
| 30 | 700 | 14 |
| 25 | 800 | 12 |
| 25 | 600 | 8 |
| 25 | 700 | 15 |

FIG. 7

| Weight (g) | Particle Diameter (μm) | Pore Diameter (Å) | Manufacturer | Type | Time (hr) | % carbon |
|---|---|---|---|---|---|---|
| 10 | 10 | 100 | Stellar | B | 12 | 8.1 |
| 10 | 5 | 100 | Kromasil | B | 12 | 19.7 |
| 10 | 5 | 100 | Kromasil | B | 12 | 19.6 |
| 10 | 5 | 100 | Fuji | B | 12 | 13.6 |
| 10 | 5 | 288 | Fuji | B | 12 | 3.2 |
| 10 | 5 | 100 | Pinnacle | A | 12 | 8.7 |
| 10 | 5 | 182 | Thermo | B | 12 | 17 |
| 10 | 5 | 182 | Thermo | B | 12 | 5.3 |
| 10 | 5 | 150 | Zorbax | B | 12 | 14.1 |
| 5 | 3.5 | 80 | Zorbax | B | 9 | 5.2 |
| 10 | 5 | 100 | Kromasil | B | 3 | 3 |
| 10 | 5 | 300 | Poroshell-Agilent | B | 12 | 2.5 |

FIG. 8

CARBON COMPOSITE MATERIALS FOR SEPARATIONS

CROSS-REFERENCE TO RELATED APPLICATIONS

This application is a United States national phase application filed under 35 U.S.C. §371 of International Application Serial No. PCT/US11/55205,filed on Oct. 7, 2011 and entitled "CARBON COMPOSITE MATERIALS FOR SEPARATIONS", which claims priority to U.S. Provisional Application Ser. Nos. 61/452,112, filed on Mar. 12, 2011, and 61/390,821, filed on Oct. 10, 2010, both entitled "CARBON COMPOSITE MATERIALS FOR SEPARATIONS", the contents of each of which being incorporated herein in their entirety.

FIELD OF THE INVENTION

The present invention provides carbon composite materials which are useful in analytical separations processes. The invention also provides a method for manufacturing the chromatographic support materials of various dimensions and particle architectures by laminating carbon on porous and nonporous materials with a chemical vapor deposition (CVD) process.

BACKGROUND OF THE INVENTION

An important property of high-pressure liquid chromatography (HPLC) separation media is that it must be highly and selectively retentive for the analyte of interest. Interest in carbon sorbents for HPLC is motivated by their ability to retain very polar analytes that would not be significantly retained or would not otherwise be separated on traditional C18-modified silica bonded phases. The unique selectivity originates from the fact that pure graphite is a crystalline material made up of sheets containing large numbers of hexagonally arranged sp2 hybridized carbon atoms linked by conjugated pi-bonds. These highly hydrophobic but exceptionally polarizable sheets of carbon have a high affinity for analytes that are also highly polarizable, highly polar or can accept a hydrogen bond. For example, polar nitrobenzene ($\pi^*$dipolarity ~1.11) is much more retained on carbon than is benzene ($\pi^*$~0.52). This is in contrast to conventional alkyl bonded phases that do not easily retain polarizable molecules.

There are many examples of applications that take advantage of the selectivity property including separation of water soluble micropollutants from water, drug metabolites, and pesticides. Additional applications include benzene and naphthalene sulfonates, acidic pesticides, and highly hydrophilic metabolites in blood and urine [10].Carbon also has advantages over synthetic polymeric supports that can shrink and swell as the solvent, pH, and ionic strength are changed. Other applications specific to carbon include selectivity for planar molecules. One example application for carbon sorption media is the trace extraction of coplanar polychlorinated biphenyls (PCBs), dibenzo-p-dioxins and dibenzofurans from other PCB congeners.

Particles useful as separation media in HPLC have many requirements that are met by most HPLC phases on the market today. This is in large part due to the fact that modern HPLC particles are based on porous silica. Commercially available silica particles for HPLC are typically stringently monodisperse and are mechanically strong enough to withstand packing pressures far exceeding 5000 psi. The particles are also spherical and are chemically stable in neutral and acidic solutions. Furthermore, the pore diameters of the silica are appropriately sized (60-350 Å) for liquid analysis and surface areas are high (>100 m$^2$/g). Selectivity for analytes can be tuned to give supports whose surfaces have been bonded with various silanizing agents that impart a unique surface on the silica particle. The surface of the silica is often completely covered and is chemically homogeneous, as is well known in the art. However, complete surface coverage is not necessarily a requirement for desirable separations as is also well known in the art.

Carbon-coated sorption media has been widely employed for chromatographic support phase, including for HPLC phases. Carbon is an ideal adsorbent for a variety of analytes studied in HPLC, and therefore its use has been widely accepted.

The use of chemical vapor deposition (CVD) processes to produce carbon coatings has been extensively studied. Such processes are used, for example, to carbon coat nuclear materials or to infiltrate porous bodies so as to produce lightweight structural materials. This topic is discussed in more detail in The Chemistry and Physics of Carbon, 173-263 (P. Walker et al., eds. 1973), the disclosure of which is incorporated by reference herein.

Commercially available carbon-based supports useful for HPLC applications include carbon-clad zirconia/titanium and porous graphitic carbon (PGC). U.S. Pat. Nos. 5,254,262, and 5,108,597 describe the cladding of carbon on metal oxide particles such as zirconia. The inventors emphasize how to achieve monodispersity, extreme pH stability, and high efficiency. Using low pressure, high temperature vapor deposition, a carbon separation material was procured by pyrolizing a variety of saturated and unsaturated hydrocarbons on zirconia at 700° C. in a flow through horizontal rotary reactor. The residual exposed hard Lewis acid sites on the zirconia substrate causes irreversible adsorption of many Lewis bases. Thus, the adoption of this phase has been limited. Furthermore, the method and apparatus and process conditions as described in the patent has been found to be inadequate for obtaining coatings on silica particles.

In response to the fact that the process based on U.S. Pat. Nos. 5,254,262 and 5,108,597 is inadequate for obtaining significant carbon coatings on silica, Paek et al. described a process for obtaining carbon coated silica particles by first depositing metals (ex. Alumina) on the surface of the silica particles with subsequent carbonization by chemical vapor deposition using the method published in the aforementioned patents (Journal of Chromatography A Volume 1217, Issue 42, 15 Oct. 2010, Pages 6475-6483.) The Authors demonstrated that the coated materials could be packed into HPLC columns and that acceptable chromatographic performance could be achieved. This approach, however, also suffers from exposed Lewis acid sites, similar to that described above with respect to U.S. Pat. Nos. 5,254,262 and 5,108,597.

K. Unger et al. (U.S. Pat. No. 4,225,463) describe porous carbon support materials based on activated carbons and/or cokes. The materials are prepared by treating hard activated carbon or coke particles with solvents, and then heating them at 2400-3000° C. under an inert gas atmosphere. The resulting support materials are described as having a carbon content of at least 99 percent, a specific surface area of about 1-5 m$^2$ per gram, and a particle size of about 5-50 μm. The resulting surface area and pore size are not generally reproducible. In addition, residual metals in the material adsorb analytes. It is generally understood that these materials are not useful for analytical separations.

U.S. Pat. No. 5,431,821 describes coating an oligomeric acetylene based polymer on the surface of porous silica with subsequent carbonization in a flow through batch reactor. The carbon source is deposited on the surface by evaporation and is subsequently carbonized. The make-up gas does not carry a carbon source. This material suffers from blocked pores, which limits its utility in HPLC.

Leboda et al. (Chromatographia, 13, 703 (1980); Chromatographia, 14, 524 (1981); Chromatographia, 13, 549 (1980)) describe chemical vapor deposited (CVD) methylene chloride on porous silica surfaces at 300-500° C. with subsequent deposition of a variety of aromatic alcohols (n-octanol) as a post treatment to complete the surface coverage. Leboda et al. used two methods to make the particles. First, Leboda et al. describe the two-hour pyrolysis of dichloromethane (CH2Cl2) on partially dehydroxylated silica gel (particle size range 0.15-0.30 mm) at 500° C. and atmospheric pressure in an autoclave. Additionally, Leboda et al., Chromatographia, 12, No. 4, 207-211 (1979) describe the catalytic decomposition of alcohol onto the surface of SiO2 in an autoclave, at a pressure of 25 atmospheres and a temperature of 350° C. for 6 hours. The resulting material possesses a surface having from "a few to several dozen percent carbon on the surface." The problem with this technique is that the particles are not mixed as the reaction occurs thus producing irregular coatings. Leboda et al. have also described a low pressure rotary reactor for the production of carbon coated particles to improve the mixing. Leboda et al. also describe seeding carbon deposition on the silica surface by depositing metals such as iron or alumina. This approach generally clogs the pores and gives poor chromatographic performance.

Leboda et al. further describe carbon-silica adsorbents obtained as a result of n-amyl alcohol pyrolysis. They concluded that these materials have a better ordered and more spatially developed structure of the carbon deposit than those obtained by dichloromethane pyrolysis. The carbon deposit formed by n-amyl alcohol pyrolysis is a better catalyst of carbonization than the deposit formed by dichloromethane pyrolysis.

Porous graphitic carbon is the most commercially successful HPLC carbon stationary phase on the market. It is prepared by filling the pores of a silica gel with a polymer comprising carbon, thermolyzing the polymer to produce a silica/carbon composite, dissolving out the silica to produce a porous carbon, and subjecting the porous carbon to graphitizing conditions. U.S. Pat. No. 4,203,268 describes a method for producing a porous carbon material suitable for chromatography or use as a catalyst support, which involves depositing carbon in the pores of a porous inorganic template material such as silica gel, porous glass, alumina or other porous refractory oxides having a surface area of at least 1 $m^2/g$, and thereafter removing the template material. The resulting carbon is not a true graphite, but it does have a structure similar to two dimensional graphite making it chromatographically essentially indistinguishable from carbon that has been graphitized. Even though the material is mechanically stable enough to be used as a HPLC stationary phase, the material suffers from an expensive manufacturing process and is also 100% carbon, thus the phase is often prohibitively retentive. In addition, it has been reported that this phase is not stable at pressures exceeding 5000 psi and that the column life at those high pressures is short. Recent trends toward higher pressures (>5000 psi) have become a key trend in which is commonly employed in HPLC and it is clear that these particles will not withstand these ultra high pressures.

O. Chiantore et al., Analytical Chemistry, 60, 638-642 (1988), describe carbon sorbents which are prepared by pyrolysis of either phenol formaldehyde resin or saccharose on spheroidal silica gels coated with these materials. The pyrolysis is performed at 600° C. for one hour in an inert atmosphere, and the silica is subsequently removed by boiling the material in an excess of a 10% NaOH solution for 30 minutes.

Chiantore et al. conclude that, at the temperatures employed in their work, the carbonaceous polymer network that is formed still maintains the chemical features of the starting material. To obtain carbons where polar functional groups have been completely eliminated, the authors conclude that high temperatures (greater than 800° C.) treatments under inert atmosphere are necessary.

In addition to materials which comprise a carbon matrix or core, other HPLC chromatographic support materials are known which have a carbon coating on a substrate of silica. For example, N. K. Bebris et al., Chromatographia, 11, 206-211 (1978) describe the one-hour pyrolysis of benzene at 850° C. onto a substrate of Silochrom C-120, a macroporous silica (SiO2) which contains particles of irregular form with an average size of 80 μm. Benzene pyrolysis was also carried out at 750° C. onto a substrate of Spherisorb S20W, a metals rich silica gel which contains spherical particles of diameter 20 μm. All of these efforts have been conducted on metals rich silica gel.

P. Carrott et al., Colloids and Surfaces, 12, 9-15 (1986) cracked furfuraldehyde vapor on precipitated silica at a temperature of 500° C. for various times, to achieve carbon loadings of 0.5, 8.6 and 16 percent. Carrott et al. conclude that the external surface of the resulting carbon-coated silica was hydrophobic, while the internal surface was hydrophilic, indicating that the internal surfaces are not well coated.

H. Colin et al., J. Chromatography, 149, 169-197 (1978) compare non-polar chemically-bonded phases (CBP), pyrocarbon-modified silica gel (PMS) and pyrocarbon-modified carbon black (PMCB) as packings for reversed phase HPLC. These phases all suffer from blocked pores and poor chromatographic performance.

Catalyst supports have also been prepared by deposition of carbon on alumina. For example, S. Butterworth et al., Applied Catalysis, 16, 375-388 (1985) describe a y-Al2O3 catalyst support having a coating of carbon deposited by vapor-phase pyrolysis of propylene. The pure phase y-Al2O3 substrate was ground to 12×37 mesh, had a bimodal pore size distribution based around mean diameters of 110 nm, and a surface area of 130 $m^2/g$. When the vapor phase pyrolysis was performed from a flowing gas mixture of argon and propylene at 673 K, Butterworth et al. describe that the pure phase $y-Al_2O_3$ was completely covered at a carbon loading of 7 wt-%.

Certain metal oxides have been coated with carbon for use as nuclear reactor fuels. For example, P. Haas, Chemical Engineering Progress, 44-52 (April 1989) describes that small spheres of oxides of U, Th and Pu were required for high-temperature, gas-cooled nuclear reactor fuels. These fuels were coated with pyrolytic carbon or other ceramics to serve as "pressure vessels" which contain fission products.

FIG. 1 summarizes relevant prior art for carbon based particles that have been employed in HPLC. FIG. 1A shows a Type A silica that has been coated with pyrolytic carbon. In this case, either a metal is deliberately placed on the surface or is incorporated on the surface in various oxidation states and chemical forms. These sites act as nucleation sites for carbon formation on the surface. As is shown in the FIG. 1A, certain analytes can interact with the uncovered metals or with the uncovered Si—OH groups which become activated with an adjacent metal. One example of a common effect of these metal groups is increased retention of basic analytes under acidic eluent conditions. As previously noted, Paek et al. have deliberately placed metal on the substrate surface to aid carbon deposition. FIG. 1B shows a zirconia substrate that has been coated with a pyrolitic carbon. This material is not fully covered, so any Lewis base analytes may interact with the uncovered zirconia substrate and greatly increase retention or in some cases, prevent elution. It is a well known practice in the art to place a competing Lewis base into the eluent so as to compete with the analyte for the Lewis base sites on the chromatographic substrate. FIG. 1C. shows the surface of porous graphitic carbon. This material has been fully graphitized and is 100% carbon. It is well known that very polar analytes or planar species are highly retained on these materials. It is also clear that in contrast to other prior art materials, this material does not have any substrate. The absence of substrate has its advantages and disadvantages. It is well known that substrate-less materials are not useful for separations exceeding 400 bar as they are not typically mechanically stable or the packed bed is not stable at those hydrostatic pressures. It is significant to note that since the surface is 100% carbon, it can not be tuned and thus retention can not be tuned without unique and exotic mobile phase additives.

The particles of the present invention do not have the same problems as carbon coated on zirconia. These particles are free from residual Lewis Acid sites and will elute strong Lewis bases without a Lewis base eluent modifier such as phosphate. Even if enough coverage of the base zirconia is achieved so that an eluent modifier is not required, peak tailing associated with Lewis acid and Lewis base interaction will still be observed. In addition, the present invention teaches that in order to achieve a significant amount of carbon coating in a reasonable amount of time, one may employ increased pressure in the reactor to improve the level of carbon source present for reaction.

Our co-pending patent application number PCT/US 11/21537 describes a fluidized bed useful for obtaining carbon coated particles, and is incorporated herein by reference. The present invention is primarily directed to particles for HPLC, which are much smaller in diameter compared to solid phase extraction media. We have found that it is preferable to provide a fluidized bed reactor with a diameter of less than 6" ID for HPLC particles. Advantages of such reactor size include better control of vapor deposition, better reproducibility of the fluid bed, and less loss of end product. In one embodiment, the fluidized bed diameter of the present invention is 3 inches. In yet another embodiment, the reactor diameter is 1 inch. Reactor lengths of 10-50 inches generate economically significant volumes.

Silica particles are known in the art to be classified as Type A or Type B, wherein Type B silica contains less than 20 ppm total metals, and Type A silica typically contains greater than 75 ppm total metals. For the purposes hereof, the term "metals" is intended to mean any element from the alkali, alkaline, transition, post transition, lanthanides, and actinide elemental groups, as is well understood in the art of chromatography. Common examples of metals found as impurities in silica may include sodium, calcium, iron, titanium, and zirconium, though it is also contemplated that any metal may be present as a contaminant in the particulate substrate. Metals are heat and electrical conductors, malleable, and can form cationic or ionic bonds with non-metals. Metals are considered as impurities that are detrimental to the goals of chromatographic separation due to the tendency to acidify the free silanol groups, and to render the separation generally less reproducible.

While carbon coatings on Type A silica have been described as a result of the beneficial metal nucleation sites available in Type A silica, efforts to carbon coat Type B silica have heretofore been unsuccessful. It has been found that Type B silica may be advantageous as an HPLC support because it is ultra pure and is virtually metals free. Metals that are incorporated into the silica backbone or are bonded or are adsorbed on the surface can cause a variety of deleterious effects on chromatography as is commonly described in the art. The metals found in Type A silica can be elemental, oxides, ions, or any other metal form and include but are not limited to zirconia, titanium, iron, aluminum, magnesium, sodium, calcium, potassium, chromium, copper, and zinc. High levels of residual metals in Type A silica cause increased retention of amines and generally result in less reproducible chromatographic elutions.

Using the particles, method, and apparatus of the present invention, we have discovered that carbon may be successfully coated on substantially metal-free inorganic oxide substrates, such as Type B silica. In addition, we have found that desirable carbon loading can be achieved on such substrates that are fully or partially hydroxylated. In a preferred embodiment, the substrate of the present invention has a total metals content of less than 50 ppm. However, it is anticipated that a Type A silica could be carbonized with the method of the present invention and then post treated with an acid to reduce the total metals to a desired level such as less than 50 ppm.

Conventional coating techniques fail to yield a chromatographically significant coating of carbon on low-metal substrates unless the surface has been pre-treated with a metal as disclosed by Paek et al. The present invention introduces a method for obtaining carbon coatings on substantially metal-free substrates, such as Type B, silica to form a desirable chromatographic support media.

Furthermore, the present coating technique is applicable to a multiplicity of low or no metal substrates. The present invention is effective in coating particles of various diameters and pore sizes. Using the methods of the present invention, carbon may also be coated on superficially porous particles to provide for ultra-fast separations.

Another issue in the manufacture of chromatographic-grade carbon-coated silica is that the small diameter silica particles (<10 μm) tend to cling to the walls of the reactor. Carbon-coated zirconia or large (>30 μm diameter) silica particles do not pose such problem because, unlike small silica particles, these particles are free flowing and much more dense. Particle caking and static cling of small diameter silica particles results in agglomeration in the reactor and inhomogeneous reaction, thus causing irreproducible retention times for select analytes in chromatographic analysis. We have also found that small particles are more likely to be carried by the carrier gas out of the reactor zone. If a horizontal rotary reactor is used, upon completion of the reaction, uncoated particles that have been carried out of the reactor zone are inevitably mixed with the coated particles. The present invention overcomes this problem by implementing a fluidized bed reactor with a specific filter at the outlet of the reactor.

In addition to the above, the prior art is silent regarding the utility of tuning or pre-selecting the amount of carbon deposited on the substrate for sorbent and separation applications. The present invention provides the selection of various amounts of carbon deposited on various types and sizes of particles. Thus, the retention time of a selected analyte may be pre-determined by the extent of the carbon loading applied to the substrate

SUMMARY OF THE INVENTION

As used herein, the phrase "composite", "carbon composite", or "carbon laminated" means that an outer layer, sheath, coating, or cladding of pyrolytic carbon is bonded or otherwise integrally attached to the underlying substrate. As used herein, "pyrolytic carbon" is intended to refer to carbon formed by the carbonization of a suitable carbon source.

The present invention provides a carbon composite support material which is useful as a sorbent in analytical or preparative high pressure liquid chromatography columns. For the purposes hereof, the terms "support material", "separation material", "sorption material", "support media", "sorption media", "stationary phase", and "support media" are intended to refer to the material utilized as a sorbent in chromatographic and separations processes. The material is preferably produced in economically significant quantities by depositing carbon from the gas phase at pressures greater than atmospheric pressure on the particles in a fluidized bed or a horizontal rotary kiln. The material may comprise carbon-composite particles of an inorganic oxide such as Type B silica. For the purposes hereof, the term "silica" is intended to include silicon dioxide and silica gel. In order to facilitate packing of HPLC columns, it is preferred that each individual particle be of sufficient mechanical strength to withstand the packing and subsequent elution process. This includes packing pressures greatly exceeding 5,000 psi. It is also anticipated that the carbon laminate material may be treated after manufacture to clean reaction byproducts such as naphthalene from the surface of the carbon and optionally mask any residual uncovered base material.

The inorganic oxide substrates of the present invention preferably have a particle diameter greater than 0.5 μm and less than 500 μm.

The substrate materials have an appropriate surface area, preferably greater than 10 $m^2/g$. The surface area is more preferably 100-300 $m^2/g$. The pore size of the base substrate material is preferably 10-5000 angstroms and more preferably 60-300 angstroms. However, it is anticipated that non-porous particles may also be coated, including nano particles (diameter <1 μm) of silica and magnetic particles and nano particles. The carbon coating is preferably pyrolitic and non-porous although it is anticipated that the carbon layer itself can be treated to render it porous as is commonly known in the art of carbon sorbents.

As used herein, the term "pores" (or "porosity") refers to "open pores" only. Pores may be defined as open voids with a minimum mean diameter of at least 10 angstroms and a minimum mean depth that is greater than the respective minimum mean diameter. A porous material is defined as having pores, i.e. cavities, channels, or interstices, which are deeper than they are wide. The pores defining a porous material are permanent and arranged.

By "surface of the particle", it is meant the exterior surface as well as the surface of the open pores. It is not necessarily intended that the carbon laminate cover substantially the entire surface of the porous material, thus defined. The carbon may also deposit on the surface to form a patchwork of carbon. The patches of carbon can be a mixture of both amorphous and graphitic carbon. The carbon laminate is preferably 1-40% of the material weight as determined by elemental analysis.

In some embodiments, the thickness of the carbon laminate over the porous substrate ranges from the diameter of a single carbon atom to about 50 angstroms. Thus, the carbon laminate does not appreciably decrease the diameter of the pores. The selected particle may have larger than desired pores that accommodates additional carbon layers without compromising the porous characteristics of the particle. In some embodiments, the pores of the substrate may be 10-100 angstroms larger than the desired, post-coating pore size.

The surface of the substrate particle that is not covered by the lamination process may be treated with a masking reagent to alter the chemical homogeneity of the surface. For example, unreacted residual silanol species on the surface of the particle may be silanized with an appropriate silanization reagent. A very common silanization reagent is octyldecylsilane although there are many hundreds of commonly available silanization reagents known in the art. It is anticipated that as an alternative to silanization, oligomers may be adsorbed on the surface or any number of bonding chemistries may be implemented to mask residual uncovered silanols. Possible oligomers include styrene, acrylates, polyesters, and the like.

One anticipated alternative to directly utilizing a substantially metal free material as the carbon deposition substrate involves acid treating the metal species-containing material after it has been coated with carbon. The acid should be strong enough to dissolve the target metal but not oxidize the carbon. Typically, a halogenated acid can be used to remove the metal from the silica. However, the acid utilized in this method may be any acid that is found to remove metals but not alter the carbon retentive characteristics.

It is anticipated that oxygen bound to the carbon at the surface may be eliminated under an oxygen free reducing atmosphere. This may be accomplished by exposing the particles at an elevated temperature to oxygen-free hydrogen with at least 5% nitrogen. Any liquid or solid reducing environment may be used to eliminate oxygen on the surface of the carbon.

The present invention further includes a method of preparing carbon composite materials comprising: 1. providing inorganic materials having a surface area greater than about 1 $m^2/g$; exposing the inorganic particles to a carbon containing gas at pressures greater than 760 mm Hg; and heating the inorganic particles and carbon containing gas for a time sufficient to deposit a substantially thin uniform layer or non-uniform patches of pyrolytic carbon on the particles. The carbon source may preferably be kept at temperatures greater than 0° C. and at pressures greater than 760 mm Hg, which is contrary to conventional approaches. In some embodiments, the present invention utilizes a vertical fluidized bed to suspend the materials and deposit the carbon from the vapor phase on the porous particles. The temperature of the process may be greater than 400° C. and, in some embodiments, is between 600-1000° C. The carbon source may be, for example, a saturated or unsaturated hydrocarbon or halocarbon. Alternatively, carbon monoxide may be used as the carbon source. One particular embodiment uses hexane as the carbon source. Preferably, the inlet gas may be substantially oxygen free. The present method may also optionally include an additional step of exposing the carbon composite particles to a gaseous reducing mixture comprising hydrogen in nitrogen at high temperature so as to cause the reduction of polar functional groups on the surface of the particles. In this manner, a more homogeneous surface chemistry can be achieved. Alternatively, the surface of the carbon may be altered by gaseous treatments to give desired characteristics. This includes the incorporation of nitrogen moiety through exposure to liquid carbon sources that incorporate nitrogen. Other moiety such as boron, sulfur, oxygen, and phosphorous can be incorporated using similar procedures.

It is an object of the present invention to provide carbon coated particles for HPLC.

It is a further object of the present invention to provide carbon coatings on substantially metal-free inorganic oxide particles.

It is a further object of the present invention to provide carbon coatings on Type B silica of various diameters and pore diameters that are useful in HPLC.

It is a further object of the present invention to provide substantially oxygen free carbon coatings on substantially metal-free inorganic oxide particles.

It is a further object of the present invention to provide carbon coatings on silica with a total metals content of less than 50 ppm.

It is a further object of the present invention to provide carbon coatings on Type B silica that is superficially porous.

It is a further object of the present invention to coat particles at pre-determined various carbon loading levels so that analyte retention characteristics may be tuned.

It is a further object of the present invention to provide a carbon coated HPLC phase that is substantially free from Lewis acid sites.

It is a further object of the present invention to provide for a carbon HPLC stationary phase based on Type B silica that is packed into a column.

It is a further object of the present invention to provide a carbon HPLC stationary phase packed into preparative, flash, or semi preparative columns.

It is an object of the present invention to provide a method for obtaining carbon coated silica particles that maintain the carbon source at a temperature that is required to effect the proper amount of carbon into the flowing vapor.

It is a further object of the present invention to provide a method that substantially eliminates oxygen from the surface of the carbon placed on Type B silica.

It is a further object of this invention to provide for a partially derivatized (i.e. silanized) surface and a partially carbon laminated surface.

BRIEF DESCRIPTION OF THE DRAWINGS

FIG. 7. shows a table of carbon deposits on Type B porous silica particles.

FIG. 8. shows a table of carbon deposition on several Type B silica with various particle size, pore size, surface chemistry, metals content, and surface areas.

DETAILED DESCRIPTION OF THE INVENTION

Figures 1A, 1B, 1C:
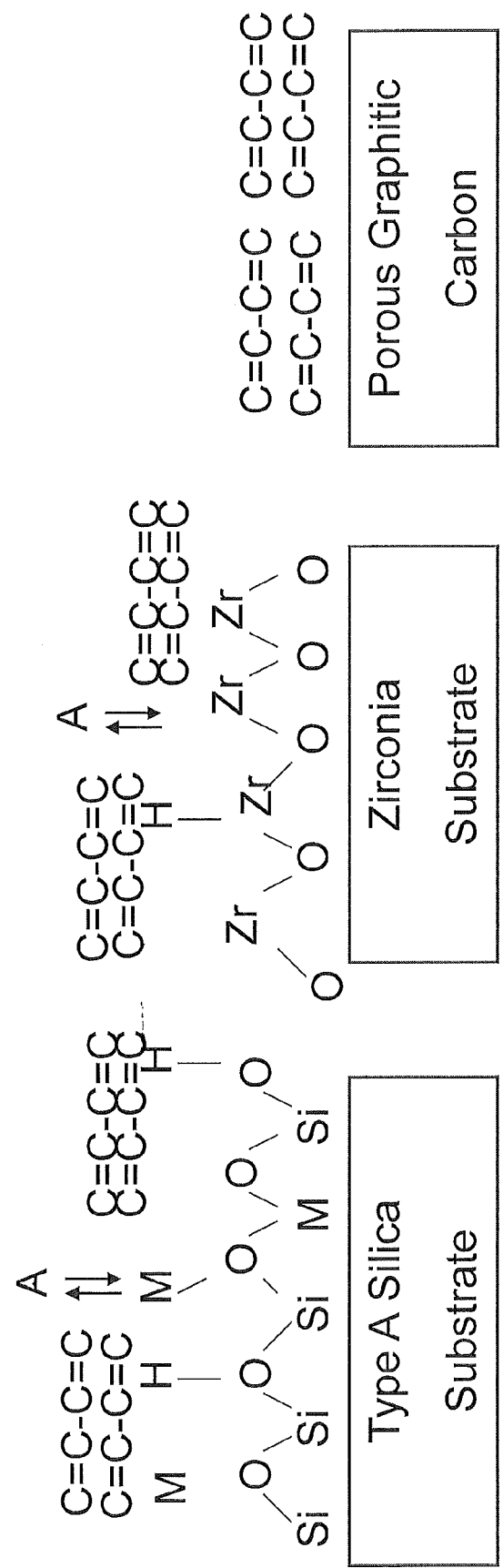
FIG. 1. shows prior art carbon separation materials comparing various substrates for carbon deposition. Substrates include A. Type A silica, B. zirconia oxide, and C. porous graphitic carbon.

The material of the present invention comprises a particle, with a core, base or substrate, and a laminate of carbon over the substrate. For the purposes of the present invention, the terms core, base, and substrate interchangeably refer to the material to which carbon is laminated to form the composite support material. In some embodiments, the core is a porous silica that is substantially metal-free (<50 ppm). The present invention also applies to core-shell particles and carbon coatings thereon that also are substantially metals free. In addition, the carbon coating process may also be applied to organic inorganic hybrid substrates that are currently marketed to the HPLC market. Because an intended use of the present support material is in high pressure liquid chromatography applications, the individual units of the material may be regular (i.e. monodisperse) in shape and particle diameter. Although the substrate preferred shape is a particle, the present invention also anticipates that substrates of various shapes, regular and irregular, may be employed.

With reference to the materials of the present invention embodied in particles, the diameter of the substrate particles may vary within ranges appropriate for the desired use of the particles. Generally in HPLC applications, particles ranging from 1-30 μm in cross-sectional dimension are preferred, and more preferably, about 2-10 μm in cross-sectional dimension. The particles are preferably substantially free from fines that have particle diameters of less than 1 μm.

One particular material as the substrate of the present carbon composite particles is a material that possesses a high total surface area with large enough pores to accommodate a carbon coating and that this surface area is not substantially reduced during the carbon laminating process and any other subsequent laminating procedure included within the scope of the present invention. Therefore, example surface areas for the substrate particles may be larger than 1 $m^2/g$ and are preferably in the range from 10-500 $m^2/g$, and more preferably about 10-300 $m^2/g$. Furthermore, the substrates may be substantially free from metals, such as less than 50 ppm. One embodiment utilizes Type B silica with a metals content of less than 20 ppm.

The present carbon laminate particles may be prepared by a high pressure chemical vapor deposition (CVD) method utilizing a fluidized bed or a rotary kiln, as discussed below, which method is also included within the scope of the present invention. Other methods such as microwave kilns are also viable provided that they provide adequate mixing of the particles. The pore diameter of the base material may be sufficiently large to permit ready diffusion of hydrocarbon vapor into the pores of the substrate particle during the CVD process. Thus, pore sizes for the substrate particles may range from about 40-5000 angstroms, and more preferably about 60-300 angstroms.

The particles of the present invention are laminated or coated with a layer of pyrolitic carbon. While any method of applying pyrolitic carbon to a porous substrate can be used in the preparation of the present carbon-composite particles, it is preferable to apply the carbon laminate in a controlled manner which results in a pre-determined carbon coverage extent upon the porous surface. It is known that the carbon may deposit on the surface initially in a patchwork of sites and thereafter spread over the surface from those initial sites. Therefore, it is not necessarily a requirement of the present invention that the surface coverage be uniform. Indeed, significant benefits can arise from a non-uniform particle coating. Chiefly, the rate/extent of retention of target analytes at the sorption media may be pre-defined ("tuned") so that the operator, through the employment of media with known carbon coating extents of less than 100%, may customize retention levels of different analytes in a given sample.

The present invention employs a high pressure chemical vapor deposition technique to laminate carbon on a porous inorganic oxide particle. For example, a carbon laminate may be applied through the present process to porous and non-porous substrates such as core shell porous silica, organic inorganic hybrid particles, or Type B silica. The carbon laminate is preferably 0.5%-40% by weight of the material, as determined by elemental analysis.

It is anticipated that the carbon source or a separate reaction feed may be doped with oxygen, sulfur, phosphorous, nitrogen, boron, fluorine, chlorine, or similar to obtain various selectivities in the composites, and to enhance or reduce retention of select analytes. For example, a carbon coating on Zorbax 5 um particles using acetonitrile as the source may incorporate up to 10% nitrogen into the carbon coating using the reaction conditions described in FIG. 7 herein. The amount of nitrogen may be adjusted to meet various separation goals. A nitrogen containing silanization reagent may also be used to incorporate nitrogen or other moiety onto the uncovered surface. Any solvent that carbonizes in the reactor and that has nitrogen in its backbone may be employed in this process. It is also known that a significant amount of sulfur may be deposited on the composite surface using propyl mercaptan and similar sulfur containing compounds as the carbon source. It is also anticipated that a surface may have multiple distinct layers with differing compositions. For instance, a lightly coated silica particle may be overcoated to incorporate nitrogen. Any number of coating layers comprising a variety of chemical moiety is feasible. For example, a coated Zorbax silica material with 2% carbon was overcoated (recarbonized) with acetonitrile to incorporate nitrogen. One key advantage to these techniques is that the polarizability and di polarity of the carbon may also be tuned, or selectively assigned as a consequence of reactant selection, stoichiometric reactant feed ratios, and multiple layer laminates. Alternatively, the particles may be coated with, for example, poly sulfide and then subsequently carbonized. The underlying substrate affects the dipolarity of the carbon and therefore its selectivity.

The laminated materials are preferably washed in a series of strong solvents (e.g. $MeCl_2$ or toluene soxhlet) to remove reaction and carbonization byproducts that may be adsorbed to the surface after the reaction. The composite materials, once washed will show little or no volatile and non-volatile extractables. This is especially true of naphthalene, which is a common reaction byproduct. The recommended approach to removal of such species is soxhlet extraction in toluene or solvent of similar strength. Typically, cleaning of the particles includes sonication in a low pressure environment to remove the air from the substrate pores with subsequent soxhlet extraction in a series of solvents. The solvents may include hexanes, toluene, tetrahydrofuran, chloroform, n-methylpyrrolidone, acetone, and/or methylene chloride. Although generally not a problem, fines may also be floated and washed away.

Figure 2:
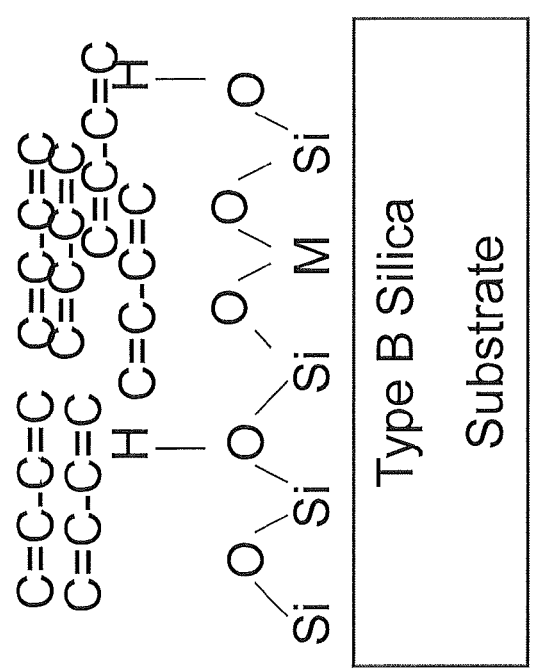
FIG. 2. shows the present invention comprising a carbon deposition on Type B silica.

FIG. 2 shows carbon coated Type B silica. Unreacted residual silanols may be silanized with an appropriate silanization reagent The silane reagent can be of the general formula $RSiO3$ where R can be any ligand commercially available. R can also be crosslinkable ligand that is subsequently reacted and crosslinked to the carbon laminate or to the adjacent reactive group. It is to be understood that the illustrated material may have a small amount of metal but is typically understood in the art as being highly purified. Type B silica particles useful in the present invention are considered to be substantially metal-free, and typically have less than 20 ppm total metals. This material can be optionally recarbonized.

It is anticipated that the surface coverage of the substrate particle can be controlled to obtain particles with any desired amount of coverage by varying the processing conditions. Multiple layers with varying or the same composition, with varying or the same coverage extent is also anticipated. This can be advantageous since the remaining uncovered portion of the surface can be derivatized with distinct chemistries to produce HPLC materials that do not have uncovered silanol groups.

It is also anticipated that, in the case of a fully covered particle or fully densified carbon particle, a portion of the carbon surface may be deactivated and rendered non selective to reduce the retention of a highly retainable analyte. In this case, polymers, oliogomers or individual molecules may be reacted with the carbon surface to render it at least partially deactivated. Such oligomers may include, for example, butadiene. Molecular weights can range from several hundred to several thousand daltons and reactions can take place via free radical polymerization. It is preferable that butadiene is significantly unsaturated so as to provide multiple attachment points to the substrate. Free radical polymerization can be accomplished with the addition of a free radical initiator such as AIBN or dicumyl peroxide or equivalent means to allow radicalization. This reaction scheme is by no means the only way to partially deactivate a carbon surface but is given merely as an example. An example alternative approach involves Fridel Crafts reactions. However, incorporation of Fridel Crafts catalyst into the surface is not desirable.

The present invention also encompasses a method for forming a HPLC support material utilizing chemical vapor deposition at high pressure (>760 torr). Either porous or essentially non-porous inorganic oxide particles can be employed as the substrate material. Advantageously, both the interior and the exterior surfaces and the surfaces of any open pores of the inorganic oxide substrates treated in accordance with the present method can be substantially or partially covered with a laminate of carbon. By "high pressure," it is meant that the pressure of the vaporized carbon source in the deposition chamber is more than about 100 Torr, and may be greater than about 700 Torr.

The preferred temperature to be maintained during deposition of carbon according to the present method ranges from about 500-1500° C., and may be between about 600-1000° C. The deposition time of the reaction may be between about 1 minute-20 hours, but more preferably is between 1-6 hrs.

Any carbon source which can be vaporized and which carbonizes on the surface of the substrate under the temperature and pressure reaction conditions of the present method may be employed to deposit a carbon laminate via CVD. Useful carbon sources include hydrocarbons such as aromatic hydrocarbons, e.g., benzene, toluene, xylene, and the like; aliphatic hydrocarbons, e.g., heptane, cyclohexane, substituted cyclohexane butane, propane, methane, natural gas, and the like; unsaturated hydrocarbons; branched hydrocarbons (both saturated and unsaturated), e.g., isooctane; ethers; ketones; aldehydes; alcohols such as heptanol, butanol, propanol, and the like; chlorinated hydrocarbons, e.g., methylene chloride, chloroform, trichloroethylene, and the like; and mixtures thereof. Another useful carbon source may be a gaseous mixture comprising hydrogen and carbon monoxide, as described by P. Winslow and A. T. Bell, J. Catalysis, 86, 158-172 (1984), the disclosure of which is incorporated by reference herein.

The carbon source may be either a liquid or a vapor at room temperature and atmospheric pressure, although it is typically employed in the CVD process in vapor form. If the carbon source is a liquid with low volatility at room temperature, it may be heated to produce sufficient vapor for the deposition process.

The carbon source itself may be cooled or heated depending on the desired amount of reactive carbon in the vapor. For the purposes hereof, the term "carbon" is intended to include any source that may contain carbon. Cooling the carbon source liquid, as described in the prior art, may not be desirable, particularly for aliphatic hydrocarbon sources. Cooling the liquid carbon source to below freezing, as is taught in the prior art, produces insufficient deposition rates at furnace temperatures of 700° C. In some embodiments, the present apparatus includes a carbon source that is maintained at a temperature greater than 0° C. In another embodiment, make up gas such as nitrogen is introduced to the system through a tee. The total flow rate flowing through the reactor is the sum of the carbon source flow rate plus the make up gas flow rate. The purpose of the make up gas is typically to dilute the amount of carbon entering the reactor. The make up gas flow rate is chosen based on the amount of observed waste carbon exited to the exhaust. If there is an excessive amount of carbon build up in the exhaust region, it is clear that the carbon source can be diluted.

In general, the choice of the optimum deposition temperature, pressure and time conditions are dependent on the carbon source employed and the nature of the substrate. For example, higher hydrocarbon vapor pressures, higher deposition temperatures and longer deposition times generally lead to increased amounts of carbon being deposited. Higher deposition temperatures and higher total pressures, however, also result in a greater tendency for deposition to be localized on or near to the peripheral surface of the substrate particles. If such increased deposition on the exterior substrate surface restricts access of the hydrocarbon vapor to the surfaces of the pores of the particle, these internal surfaces may be poorly coated, therefore impairing the chromatographic performance of the coated substrate. Furthermore, restricted access to the pores may also reduce the chromatographic utility of the particle. Thus, it is preferable to optimize deposition conditions so that the carbon laminate selectively covers both the external surface and the surfaces of the pores in the substrate, and does not restrict subsequent access of hydrocarbon to the surface of the pores. In some embodiments, optimal deposition properties may be achieved through lower deposition temperatures, e.g., 500-1000° C. and longer deposition time, e.g. up to 6 hrs, with very low concentrations of carbon in the vapor, low concentrations of vapor feed at pressures greater than atmospheric pressure. Therefore, optimum conditions may require a compromise between degree of surface coating and length of deposition time. Advantageously, the present method results in a desired extent of surface coverage of the substrate HPLC materials.

Figure 3:
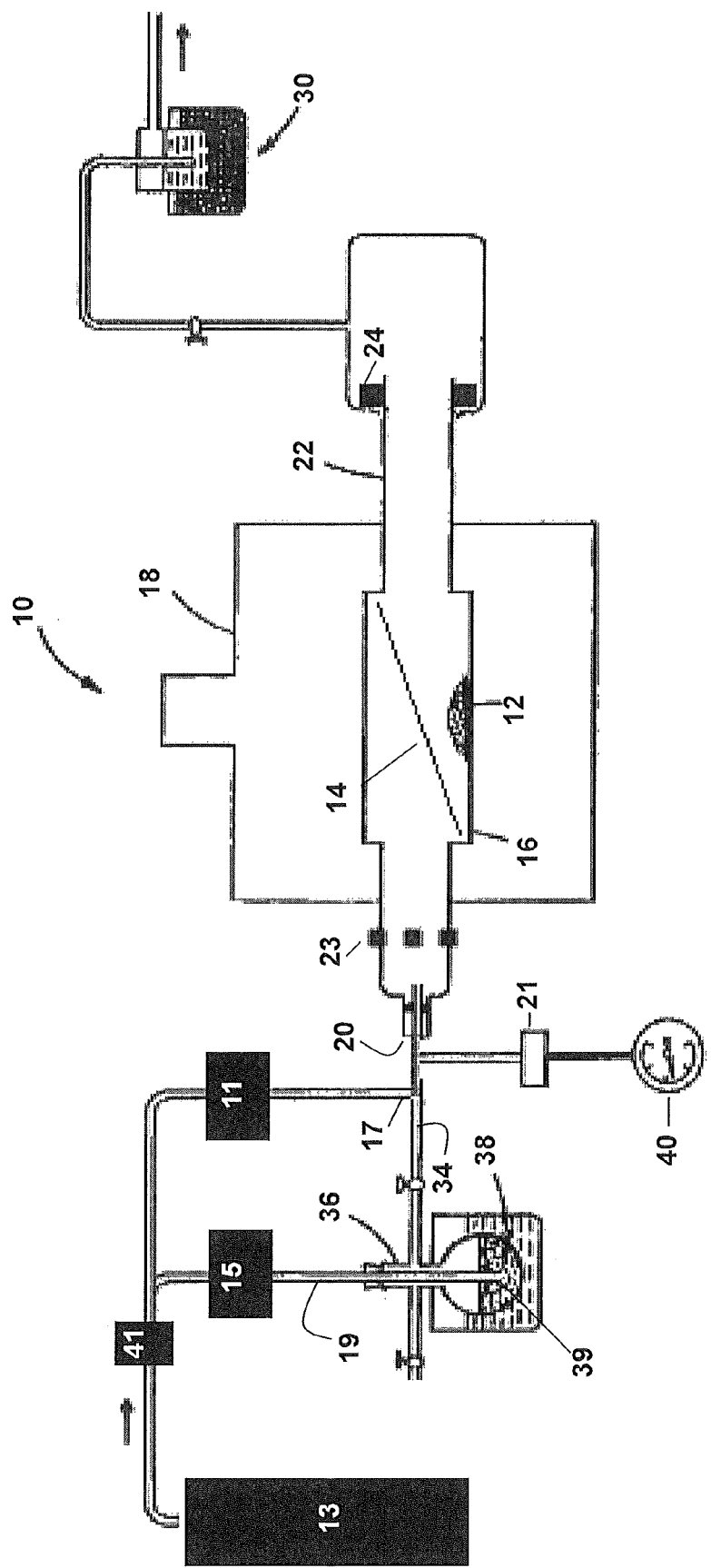
FIG. 3. shows a schematic illustration of an apparatus of the present invention.

An example chemical vapor deposition apparatus for the production of small batches, for example of less than 5 kg, is shown schematically in FIG. 3 by reference numeral 10. A sample 12 of uncoated substrate material is centrally positioned within a tubular reaction chamber 16 that has a plurality of inwardly protruding diagonal longitudinal mixing splines 14. Tubular reaction chamber 16 may be situated substantially concentrically within tubular furnace 18, which has a first end 20 and a second end 22 connected to the reaction chamber 16 with o-ring joint end fittings 24. Tubular reaction chamber 16 also has disposed in close proximity to the first end 20 a rotary engagement device that rotates the reaction chamber 16 by 90 to 180° about a substantially horizontally-oriented longitudinal axis to mix the sample substrate particles 12 with the longitudinal mixing splines 14. The rotation sequentially advances and recedes by up to 180°. The rate of successive advances can be controlled to control the amount of mixing in the reactor. Tubular furnace 18 also includes means for maintaining the elevated reaction temperature, e.g., 500-1500° C., within the furnace, for the chemical vapor deposition of the present invention. The pressure within tubular reaction chamber 16 is maintained during the reaction at a pressure which typically exceeds atmospheric pressure. The pressure may be measured by sensor 21 and indicated by gauge 40, or by any other suitable means.

Reaction chamber 16, which may be quartz, aluminum, graphite, or other materials, is connected to tubing 34 which is in turn connected to a flask 36 containing a carbon source 38. The temperature of carbon source 38 may be maintained by a temperature control bath in which flask 36 may be immersed or by other suitable means known in the art. It is preferred that the carbon source 38 and the temperature control bath are both stirred to maintain a constant temperature. The temperature control bath may be any material which is effective in transferring thermal energy to or from carbon source 38. In some embodiments, the temperature control bath may be a liquid/solid mixture such as ice and water or a dry ice and acetone.

An inert gas from a pressurized reservoir 13 flows through an oxygen scrubber 41 to feed flow controllers 15 and 11 to deliver both carbon and make up gas to the reaction chamber 16. To produce a carbon vapor, the inert gas from reservoir 13 flows through flow controller 15 at a flow rate empirically determined. The gas exiting the flow controller flows through tube 19 and into a diffuser 39, thus causing the inert gas bubbles to become saturated with carbon vapor. The carbon vapor can optionally be diluted with makeup gas from pressurized gas reservoir 13 flowing through controller 11 by mixing at tee 17. Carbon source vapor is carried through the tubing 34 and into the reaction chamber 16, where it decomposes upon contact with sample 12 maintained at the reaction temperature, e.g., 500-1500° C., within the reaction chamber. Plug 29 prevents the particles from flowing out of the reactor. Optionally, large bead mixers made of ceramic may be placed in the mixer to allow for additional mixing of the particles. Thus, a thin laminate of carbon is deposited on the surface of the porous materials of sample substrate 12.

Figure 4:
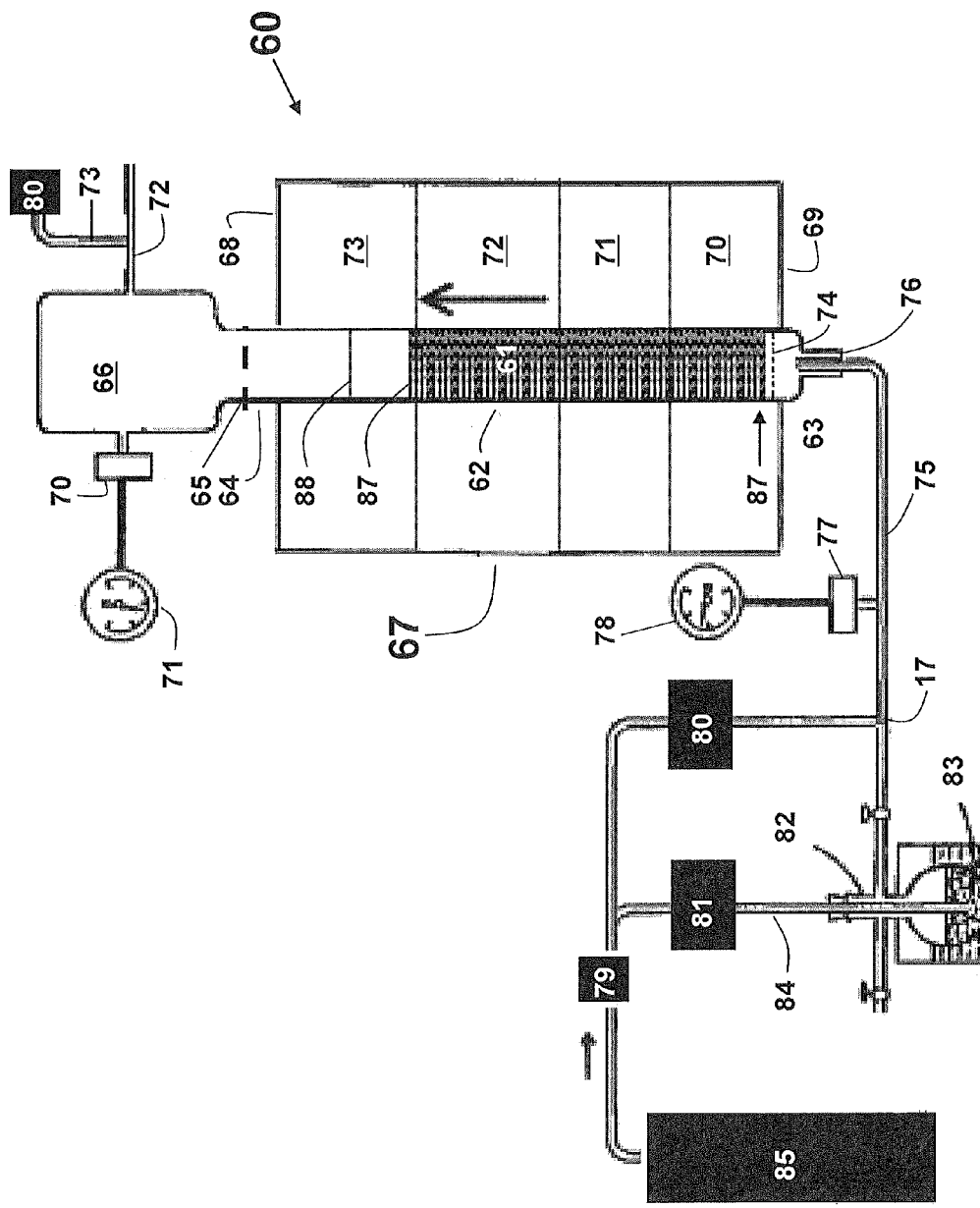
FIG. 4. shows a schematic illustration of an apparatus of the present invention.

An example chemical vapor deposition apparatus utilizing a fluidized bed for economical production of large batches (>500 g) of laminated substrate is shown schematically in FIG. 4 by reference numeral 60. Substrate 61 to be laminated with carbon is placed within a vertical tubular reaction chamber 62 that has a first end 63 and a second end 64. In close proximity to the first end 63, a diffusion plate 74 is placed to allow process gas from the gas reservoir 85 to flow through but also prevent the substrate particles 61 in the reaction chamber 62 from entering inlet gas tube 75 or first end 63. The diffusion plate can be a solid plate with a plurality of small holes drilled therein, or it can be a quartz frit of high porosity. Alternatively, it may be a stainless frit of appropriate porosity. Quartz felt or wool 87 may or may not be used to keep the particles from passing or clogging the filter. The felt also acts like a diffuser. In another embodiment, the diffusion plate is accessed for cleaning by an additional ground glass joint located between first end 62 of reactor 63 and first end of furnace 69.

The second end 64 of reaction chamber 62 is connected to a exhaust cap 66 through a ground glass joint 65. Ground glass joint 65 may be disposed between second end 68 of furnace 67 and second end 64 of reaction chamber 62. A pressure transducer 70 with pressure reader 71 and is also connected to exhaust port 66. The exhaust gas and reaction byproducts exit the reactor through port 72. Optionally, exhaust port 72 is connected to a gas chromatograph and mass spectrometer 80 through a sampling tube 73 and an injection valve to monitor and control the reaction byproducts. Optionally, port 73 may be outfitted with an adsorption tube that can be occasionally desorbed into the GCMS at regular intervals. Optionally, the reaction may be monitored with near infrared or particle size detectors.

Reaction chamber 62 is situated within a furnace 67. In the illustrated embodiment, furnace 67 has a plurality of independently controlled heating zones comprising a first heating zone 70, a second heating zone 71, a third heating zone 72, and a fourth heating zone 73. Each zone may be operated independently at selected temperatures. The number of heating zones may be selected to provide enough heating energy to the process to thoroughly maintain a constant radial temperature profile in reaction chamber 62 at one or more desired set point temperatures. Inlet tube 75 is connected to the reaction chamber 62 with an o-ring and end fittings 76. Furnace 67 also includes means for maintaining the reaction temperature, e.g., 500-2000° C., within the reaction chamber 62 for chemical vapor deposition.

The pressure within tubular reaction chamber 62 is typically maintained at a reaction pressure which exceeds atmospheric pressure. The reaction chamber need not be tubular, and can be of any shape. In the present invention, the reaction chamber is sized and configured so that economically viable quantities of HPLC particles can be obtained. Typically, batch sizes are from 0.5-20 kg. The pressure may be measured by sensor 77 and indicated by gauge 78, or by any other suitable means. In other apparatus, it is envisioned that a flow control system could receive an input signal from sensor 77 or 71 or a combination of sensors 71 and 77 to control the process flow by adjusting flow controllers 80 and 81 accordingly. Additionally, means of monitoring the flow of vapor into the reaction chamber may be provided.

Preferably, means for agitating the sample particulate during the deposition process may be provided to ensure desired coating uniformity. This is accomplished in a fluidized bed by providing a make up gas that may or may not contain a carbon source.

Reaction chamber 62 is connected to tubing 75 which is in turn connected to a flask 82 containing a carbon source 83. The temperature of carbon source 83 may be maintained by a temperature control bath, such as that described above with respect to flask 36, in which flask 82 is immersed or by other suitable means known in the art. It is preferred that the carbon source 83 is maintained at temperatures appropriate for adequate carbonization. In one embodiment, the carbon source is maintained at room temperature throughout the reaction. In another embodiment, the carbon source may be cooled by an appropriate chilling unit. The inert makeup gas from pressurized gas reservoir 85 can be selected from any inert gas. An example inert gas useful in the present invention is nitrogen. An oxygen scrubber 79 may be employed between pressurized gas source 85 and flow controllers 80 and 81 to remove any residual oxygen from the source. The carbon and makeup gas is preferably substantially oxygen free so that the deposition rate will exceed the burning rate of the carbon.

Carbon laden vapor is carried through tubing 75 and into the reaction chamber 62, where it decomposes upon contact with sample substrate 61 maintained at an elevated temperature, e.g., 500-1500° C., within the reaction chamber. The materials in the reaction chamber 62 are mixed by the flowing gas entering the reactor through inlet 75. When the flow is zero, initial bed height is defined as the distance between the distribution plate 74 and the upper extent of packed substrate 61 bed height 87. When the gas flow is set to the optimum flow, the bed height expands to an operating bed height that is greater than initial bed height 87. This phenomenon is called fluidization. The optimum flow to produce a fluidized bed depends on the flow rate, the cross sectional area of the reactor, the density of the particles, the viscosity of the gas, the particle diameter and shape, and the bed permeability. The flow rate is preferably set at a flow rate where entrainment is not observed. Entrainment occurs when the upward buoyancy exceeds the gravitational pull and the bed becomes unstable and the particles rise off the bed and into the headspace 66 where they either fall back to the bed or exit the reactor through the exhaust port 72. The output of an inlet pressure transducer may be calibrated to detect an entrainment condition. Moreover, the particles exiting the reactor may be monitored with an appropriate detector. Additionally, fluidization conditions may be observed in the absence of the furnace so as to approximate conditions under which the bed is fluidized or becomes unstable. One other output that is useful for measuring an entrainment condition is to monitor the thermocouple temperature reading stability. Under entrainment conditions, the thermocouple temperature reading can exhibit greater noise.

Figure 5:
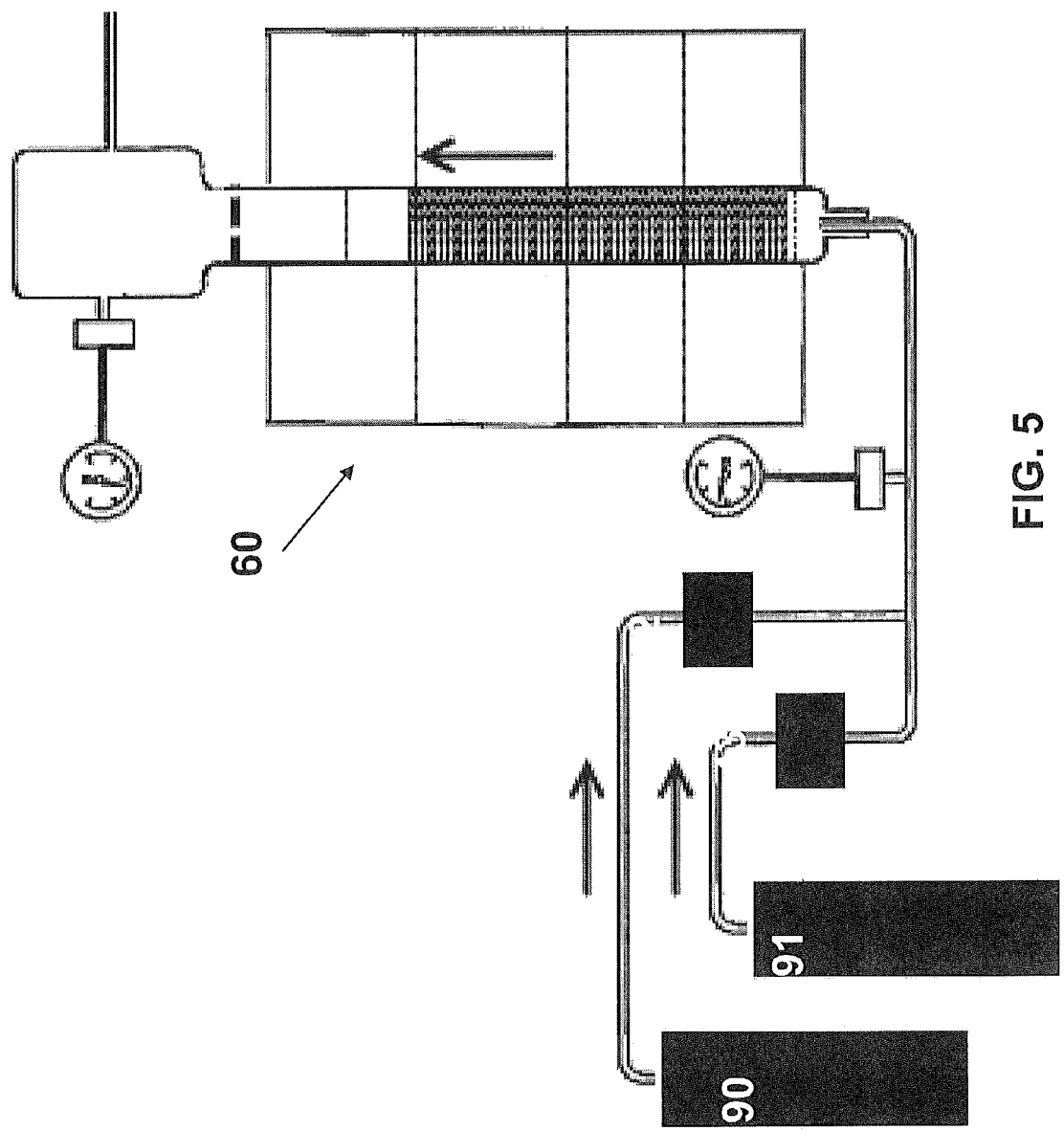
FIG. 5. shows a schematic illustration of an apparatus of the present invention.

FIG. 5 is an additional embodiment similar to that disclosed in FIG. 4 except the makeup gas container 85 is replaced with two gas containers 90, 91. The gas should be as oxygen free as possible so it is preferred that oxygen scrubbers 92, 93 or optionally 94 be placed in the flowing stream. The gas container 90 may be filled with any gas that contains a carbon source. The gas container 91 preferably contains a makeup or secondary gas. This gas can be any inert gas or any reactive gas.

Figure 6:
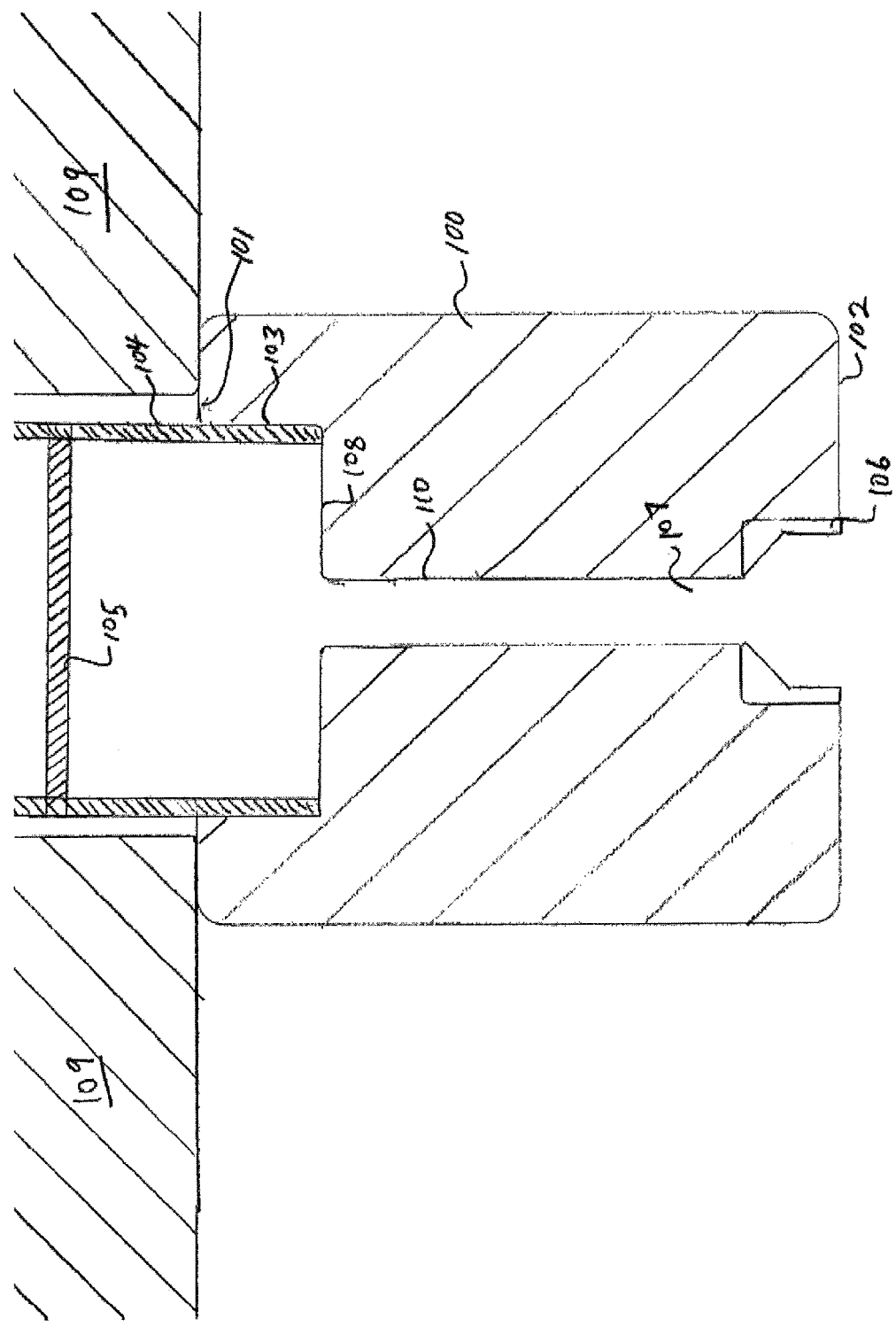
FIG. 6. shows a cross section view of a portion of an apparatus of the present invention.

FIG. 6. shows an alternative to ground glass joints and or the quartz materials utilized in the above-described embodiments. The gas inlet and diffuser may be replaced with a graphite adaptor 100 that has a first and a second end, 101, 102. On the first end 101, a reactor channel 103 extends into the adaptor block 100 that accommodates and sealingly engages the outer diameter or peripheral edge of the reactor 104. The reactor may be situated inside a furnace 109. The reactor has a frit 105 of the desired porosity installed in the bottom of this channel. The reactor material can be quartz, graphite, alumina, or any other appropriate reaction vessel tube. The reactor shape can be any shape as is necessary to facilitate the creation of the appropriate carbonized material. On the second end 102, the graphite adaptor can accommodate gas fittings 106 and inlet ports 107 as required to provide a gas inlet to the reactor. The ports are connected to one or more fluid conduits which transmit the carbon laden gas or make up gas through the adaptor to the reactor chamber. Optionally, the surface 108 in the graphite adaptor is substantially cone-shaped that connects the adaptor channel fabricated in the first end 101 and at least one gas conduit 110 in fluid communication with the second end 102. In this case, a frit may be installed in fluid conduit channel 110 or optionally situated at the surface 108. The cone can have any angle from 0 to 70°.

FIG. 7 shows example deposition method conditions that may be used with the present apparatus to obtain the particles of the present invention. As is illustrated, in sharp contrast to prior art which teaches that the carbon source should be cooled, it has been found that it is important that there is enough carbon in the reactor to accomplish the carbonization. As previously mentioned, this may be accomplished by increasing the carbon source temperature, as is described above. The deposition method conditions may be suitable for carbon deposition on porous HPLC inorganic oxide, such as Type B silica, wherein the carrier gas is a non-reactive and oxygen-free gas such as nitrogen with a flow rate of between 20 mL/minute-5 mL/minute, which may be required to establish a stable fluidized bed and/or for adequate carbon introduction in a horizontal rotary reactor. It should be understood that oxygen free gas may present an important aspect of this deposition. The carbon source itself is often well degassed. This can be accomplished through helium sparging or equivalent methods that are well known in the HPLC art. The porous substrate particles in this example have a diameter of 5 micrometers, and a mean pore size of 100 angstroms. Target carbon deposition levels may be obtained in between 1-16 hours. The carbon source may be any material that is capable of producing pyrolytic carbon with desirable HPLC separation characteristics, such as hexane. A total substrate weight of 10 g was utilized in this procedure, though the process may be scaled to exceed 1 kg by monitoring the carbon deposition rate over time.

FIG. 8 shows examples of carbon lamination on various Type B silica particles of interest for HPLC separations. The table clearly shows that the method can yield carbon on many types of Type B silica. In addition, carbon may be deposited on particles with varying pore diameters and various surface areas. It is critical to note that each of the sample particles have been packed into HPLC columns and has exhibited acceptable chromatography. The carbon source utilized in this example is hexane thermostatted at 25° C., with a furnace temperature of 700° C. The flow rate in a fluidized bed of oxygen scrubbed nitrogen is 400 ml/minute, while the flow rate in a rotary reactor of oxygen scrubbed nitrogen is 200 ml/minute. In this case, the substrate particles were cleaned to remove extractables such as naphthalene.

Figure 9:
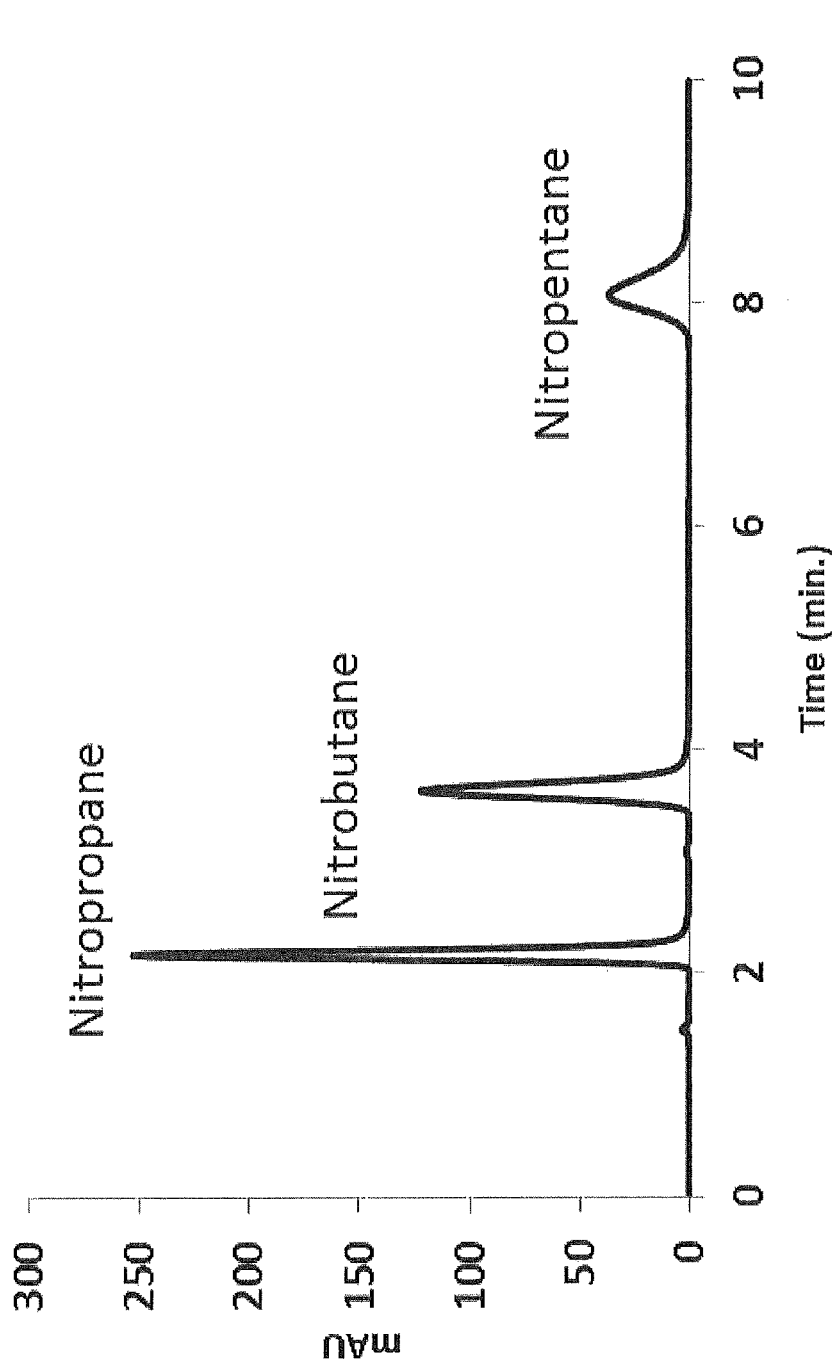
FIG. 9. shows a chromatogram demonstrating reverse phase behavior of the carbon coated materials of the present invention.

FIG. 9 show a separation of three nitroalkane homologs on carbon-coated silica, where the substrate is a type B silica from Thermo, having a particle size of 5 um, pore diameter of 180 A, and the carbon loading was 17%. Chromatographic conditions: Column dimensions, 50 mm×4.6 mm i.d.; Flow rate, 1.0 mL/min.; Mobile phase, 15% acetonitrile, 85% water; Temperature, 40° C.; Injection of 5 μL of a mixture of 100 ug/mL each of the nitroalkanes in 15/85 acetonitrile/water. Increasing retention is observed for compounds with increasing molecular size and hydrophobicity, as expected for a reversed-phase chromatographic media. The peak shapes for these compounds are acceptable and comparable to peaks for the same compounds observed on other carbon-based chromatographic media.

Figure 10:
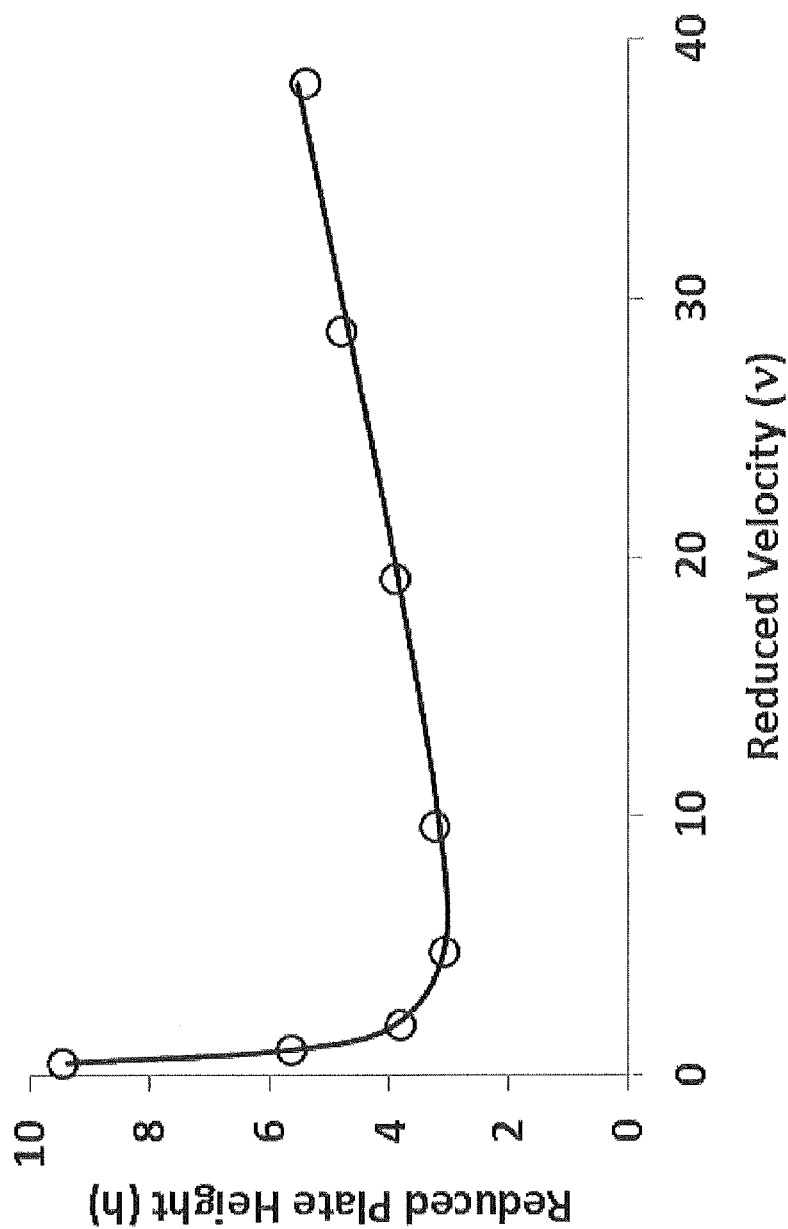
FIG. 10. shows a Van Deempter plot from a column packed with the carbon coated materials of the present invention.

FIG. 10 shows a van Deemter-type flow curve (in reduced coordinates) for the assessment of different mass transfer processes within the chromatographic column. The open circles are experimental data, and the solid line is a fit of the data to the van Deemter equation. The data shown are for the solute nitrobutane, having a retention factor of 1.7 under the conditions of the study. The van Deemter A, B, and C coefficients obtained from a multiple linear regression analysis of the data yield the following parameters: A—1.91+/−0.09, B—3.56+/−0.08, C—0.093+/−0.004. These parameters are acceptable and indicate that the mass transfer properties of the carbon-on-silica material are suitable for use in HPLC. The carbon material was prepared on a type B silica substrate from Thermo having a particle size of 5 um, pore diameter of 180 A, and the carbon loading was 17%. Chromatographic conditions: Column dimensions, 50 mm×4.6 mm i.d.; Flow rates, 0.05 to 4.0 mL/min.; Mobile phase, 15% acetonitrile, 85% water; Temperature, 40° C.; Injection of 5 μL of a mixture of 100 ug/mL each of nitropropane, nitrobutane, and nitropentane in 15/85 acetonitrile/water.

Figure 11:
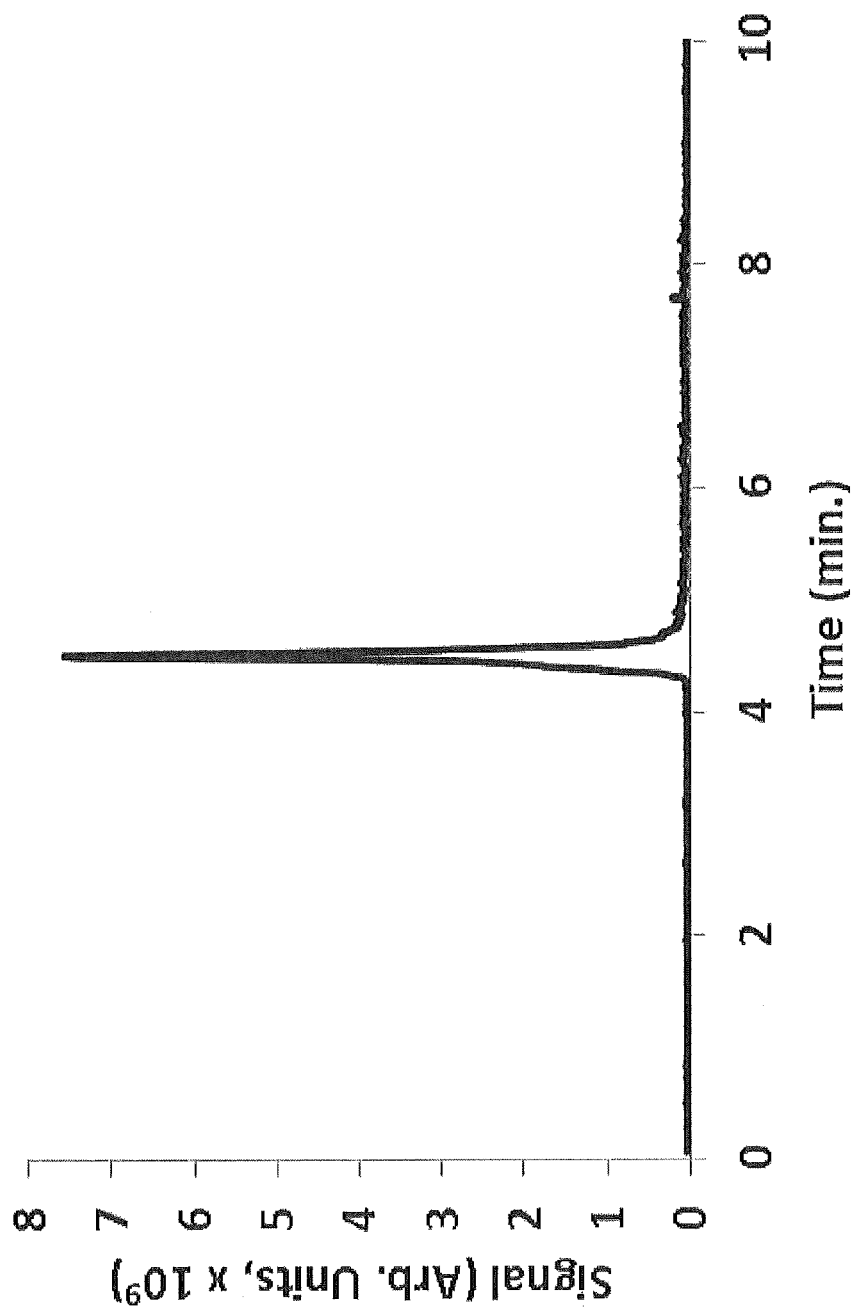
FIG. 11. shows a chromatogram of a steroid estradiol-3-sulfate obtained with the carbon coated materials of the present invention.

FIG. 11 shows an LC/MS chromatogram for a steroid sulfate in ammonium acetate eluent and demonstrates low Lewis acidity. This separation cannot be done on low to moderately covered hard Lewis acid substrates such as is found in the prior art. The FIG illustrates the analysis of estradiol-3-sulfate on a carbon-on-silica column using electrospray ionization tandem mass spectrometry detection (ESI-MS/MS). ESI-MS/MS detection requires the use of volatile buffering agents in the mobile phase when used as a detection method for liquid chromatography; in this example the buffer was ammonium acetate. This result shows evidence for the low Lewis acidity of the silica substrate underlying the carbon stationary phase, as the steroid sulfate conjugate is eluted with good peak shape even in the absence of a hard Lewis base buffer, as is required for other carbon-based phases prepared on hard Lewis acid substrates, when the substrate is not fully covered with carbon. This feature of the carbon-on-silica is particularly beneficial in the case of highly retained compounds such as the steroid used in this example, where the carbon load was deliberately lowered to obtain practical retention levels when using common organic solvents such as acetonitrile. The carbon material was prepared on a type B silica substrate from Kromatosil having a particle size of 5 um, pore diameter of 100 A, and the carbon loading was 1.1%. Chromatographic conditions: Column dimensions, 33 mm×4.6 mm i.d.; Flow rate, 0.5 mL/min.; Mobile phase gradient from 20 to 100% acetonitrile over 5 minutes, with 20 mM ammonium acetate at pH 6 as the buffering agent; Temperature, 40° C.; Injection of 9 μL of a 100 ng/mL solution of estradiol-3-sulfate in water. Mass spectrometry conditions: Parent mass, 351; fragment mass, 271; Capillary voltage, 56 V; Collision energy, 36 V, with argon as the collision gas. In terms of column stability, we have shown that these columns are stable. For example, a 4.6×50 mm column packed with Zorbax carbon on silica was subjected to 18 mL/min (9000 psi) for 30 min which gives a stability of approximately 1500 column volumes.

Figure 12:
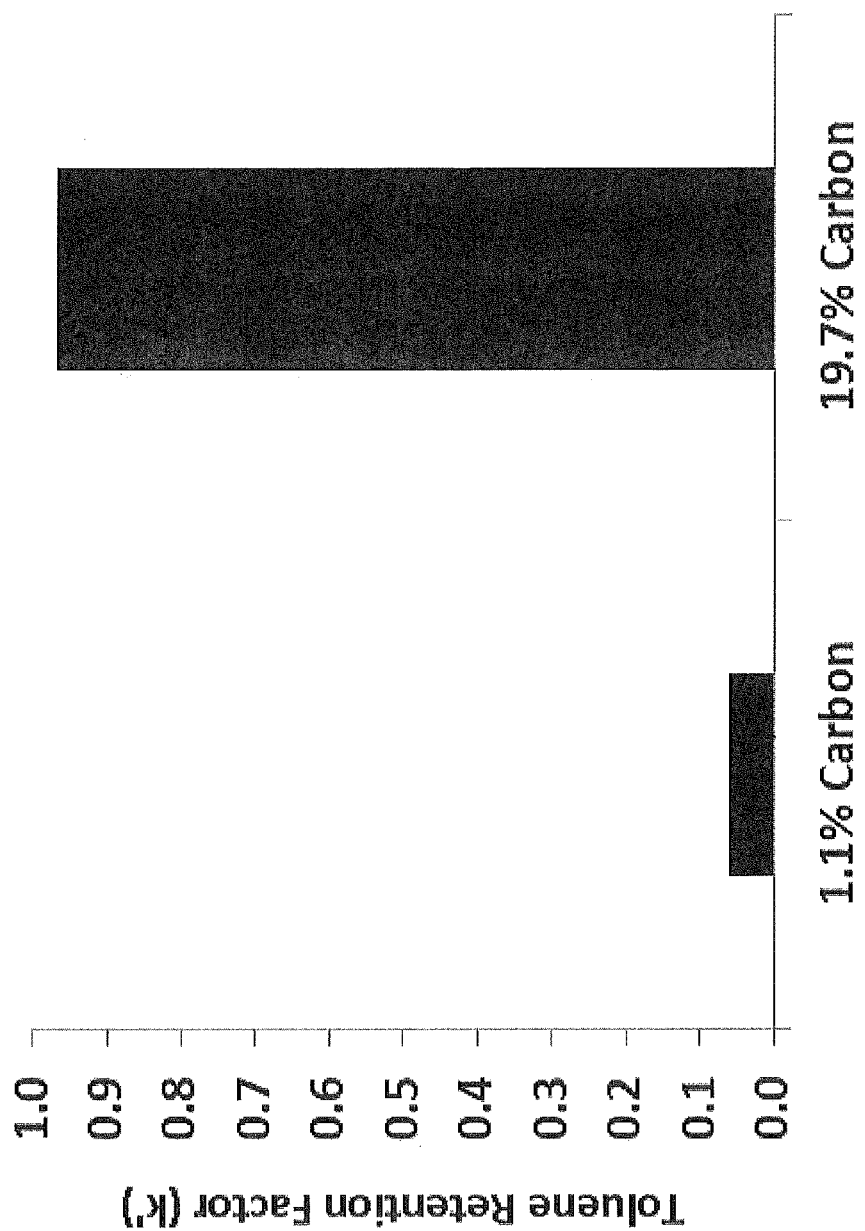
FIG. 12. shows the effect of carbon loading on the retention factor for toluene obtained with the carbon coated materials of the present invention.

FIG. 12 shows a table of toluene retention vs. % carbon for two materials. When the amount of carbon deposited on the silica substrate is increased the retention factor of the non-polar compound toluene increases as is expected for a chromatographic material that exhibits reversed-phase character.

Figure 13:
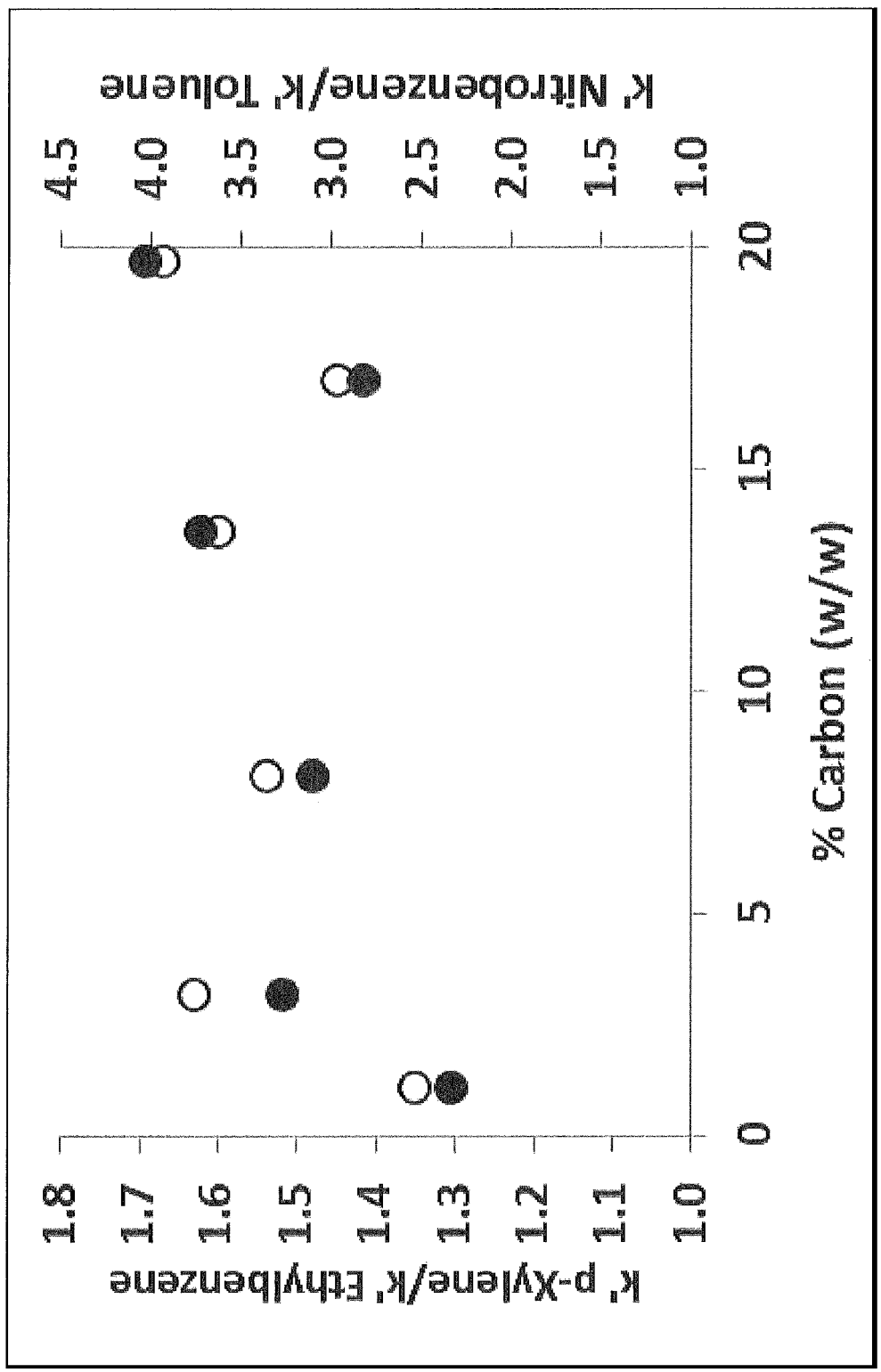
FIG. 13. shows selectivities for various analytes of interest as a function of the carbon loading on various substrates.

FIG. 13 shows plot of Nitrobenzene/Toluene and Ethylbenzene/p-Xylene selectivities vs. %C. The ratios of retention factors (selectivities) for the compound pairs nitrobenzene and toluene (filled circles), and p-xylene and ethylbenzene (open circles) are used here as indicators of the 'carbon character' of carbon-based stationary phases. Unlike conventional reversed-phase materials, carbon-based phases exhibit a significantly higher retention of p-xylene compared to ethylbenzene (conventional materials exhibit negligible separation), and significantly higher retention of nitrobenzene compared to toluene (conventional phases exhibit lower retention for nitrobenzene compared to toluene). This plot shows the selectivities of carbon phases prepared using four different type B silica substrates (Astrosil, Kromatosil, Fuji, and Thermo) under different CVD conditions that yielded carbon loadings in the range of 1.1 to 19.7% C (w/w). Despite the large variation in substrate and carbon loading, these materials all exhibit significant carbon character that is nominally independent of carbon load, as measured by these two important selectivities. Chromatographic conditions: Flow rate, 1.0 mL/min.; Mobile phase, 50% acetonitrile, 50% water; Temperature, 40° C.; Injection of 5 μL of a mixture of 100 ug/mL solutions of toluene, nitrobenzene, p-xylene, and ethylbenzene in 50/50 acetonitrile/water.

Figure 14:
FIG. 14. shows the retention factor for estrone as a function of the percent of organic modifier in the mobile phase obtained with the materials of the present invention.

FIG. 14 shows the retention factor of a steroid vs. the volume fraction of organic solvent in the mobile phase, on lightly loaded silica substrate. The previous figures show that the carbon loading on type B silica is easily adjustable, and that the resulting carbon-on-silica materials exhibit a high degree of carbon character (as measured by chromatographic selectivity) over a large range in carbon loading, and thus absolute retention. This feature of the material is highlighted in this example, which shows the retention of the steroid estrone over a wide range in acetonitrile content of the mobile phase. In this case the carbon loading of the material was 1.1%. On other carbon-on-silica materials with carbon loadings above 5% no elution of this compound is observed over the entire range of mobile phase compositions up to 100% acetonitrile, and the addition of unusual solvents such as octanol at significant concentrations (1 to 5% (v/v)) is required to obtain reasonable retention factors (<20). In this case only acetonitrile and water were used as the mobile phase components, and reasonable retention factors were observed over the range of 30 to 100% acetonitrile. Chromatographic conditions: Column dimensions, 33 mm×4.6 mm i.d.; Flow rate, 1.0 mL/min.; Mobile phases, mixtures of acetonitrile and water; Temperature, 40° C.; Injection of 5 μL of a mixture of 100 μg/mL solution of estrone in 50/50 ACN/water.

What is claimed is:

1. A composite particulate material for use as a sorption media in high-pressure liquid chromatography, said composite particulate material comprising a pyrolytic carbon coating deposited on an inorganic oxide particle, having a surface area of at least 10 m$^2$/g, said pyrolytic carbon coating covering between 5-70% of said surface area of said inorganic oxide particle, wherein said composite patriculate material is substantially metal-free.

2. A composite particulate material as in claim 1 wherein said inorganic oxide particle is Type B silica.

3. A composite particulate material as in claim 1 wherein said inorganic oxide particle has a maximum cross-sectional dimension of 50 micrometers.

4. A composite particulate material as in claim 1 comprising 1-50 weight % carbon.

5. A composite particulate material as in claim 1 wherein said inorganic oxide particle is porous, with a mean pore diameter of 10-500 angstroms.

6. A composite particulate material as in claim 1 which is free from exposed silanol groups.

* * * * *